United States Patent
Noyola et al.

[11] Patent Number: 6,138,953
[45] Date of Patent: Oct. 31, 2000

[54] SLEW RATE DIRECTION DETERMINATION FOR ACQUISITION MANEUVERS USING REACTION WHEELS

[75] Inventors: Richard A. Noyola, Torrance; Che-Hang C. Ih, Rancho Palos Verdes, both of Calif.

[73] Assignee: Hughes Electronics Corporation, El Segundo, Calif.

[21] Appl. No.: 09/033,562

[22] Filed: Mar. 2, 1998

[51] Int. Cl.[7] .............................. B64G 1/28; B64G 1/24; B64G 1/36

[52] U.S. Cl. ........................... 244/165; 244/164; 244/171

[58] Field of Search ............................. 244/158 R, 164, 244/165, 171; 701/4, 13

[56] References Cited

U.S. PATENT DOCUMENTS

| | | | |
|---|---|---|---|
| 4,071,211 | 1/1978 | Muhlfeder et al. | 244/165 |
| 4,306,692 | 12/1981 | Kaplan et al. | 244/165 |
| 4,358,076 | 11/1982 | Lange et al. | 244/164 |
| 4,767,084 | 8/1988 | Chan et al. | 244/164 |
| 5,035,381 | 7/1991 | Mathews . | |
| 5,080,037 | 1/1992 | Smay et al. . | |
| 5,255,879 | 10/1993 | Yocum et al. | 244/171 |
| 5,279,483 | 1/1994 | Blancke et al. | 244/165 |
| 5,441,222 | 8/1995 | Rosen | 244/165 |
| 5,556,058 | 9/1996 | Bender | 244/171 |

Primary Examiner—Peter M. Poon
Assistant Examiner—Charles R. Ducker, Jr.
Attorney, Agent, or Firm—T. Gudmestad; M. W. Sales

[57] ABSTRACT

Autonomous slewing of a spacecraft about a desired axis using reaction wheels permits a maximum slew rate without wheel saturation even with one wheel failure. The slew is carried out if the total angular momentum of the spacecraft is less than a momentum storage threshold determined from reaction wheel availability. The momentum threshold may be found as the radius of a sphere inscribed in a polyhedron in momentum space, the polyhedron based on the maximum single wheel capacity and the geometry of the reaction wheel system as well as the reaction wheel availability. The momentum available for the slew is determined from the total angular momentum and the availability of each reaction wheel. The slew rate magnitude and slew direction are based on the available momentum. The available momentum calculation may include factors to accommodate noise and model uncertainties, to prevent the slew from placing the total angular momentum into a state overly limiting the rate of a subsequent slew, and to avoid numerical problems.

16 Claims, 8 Drawing Sheets

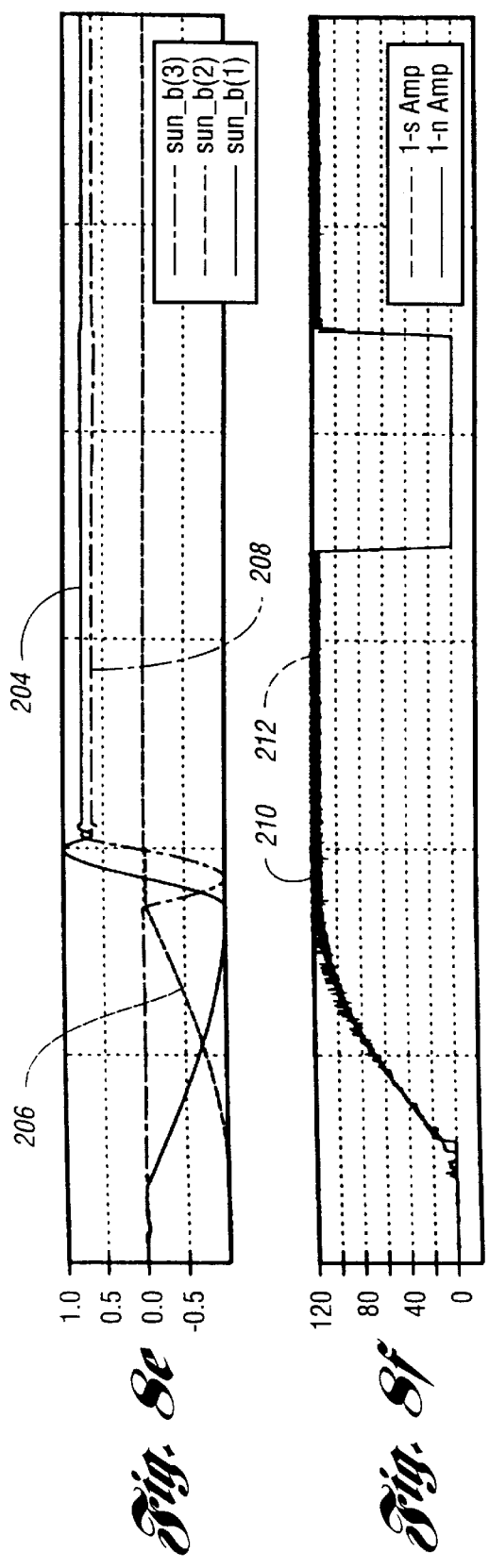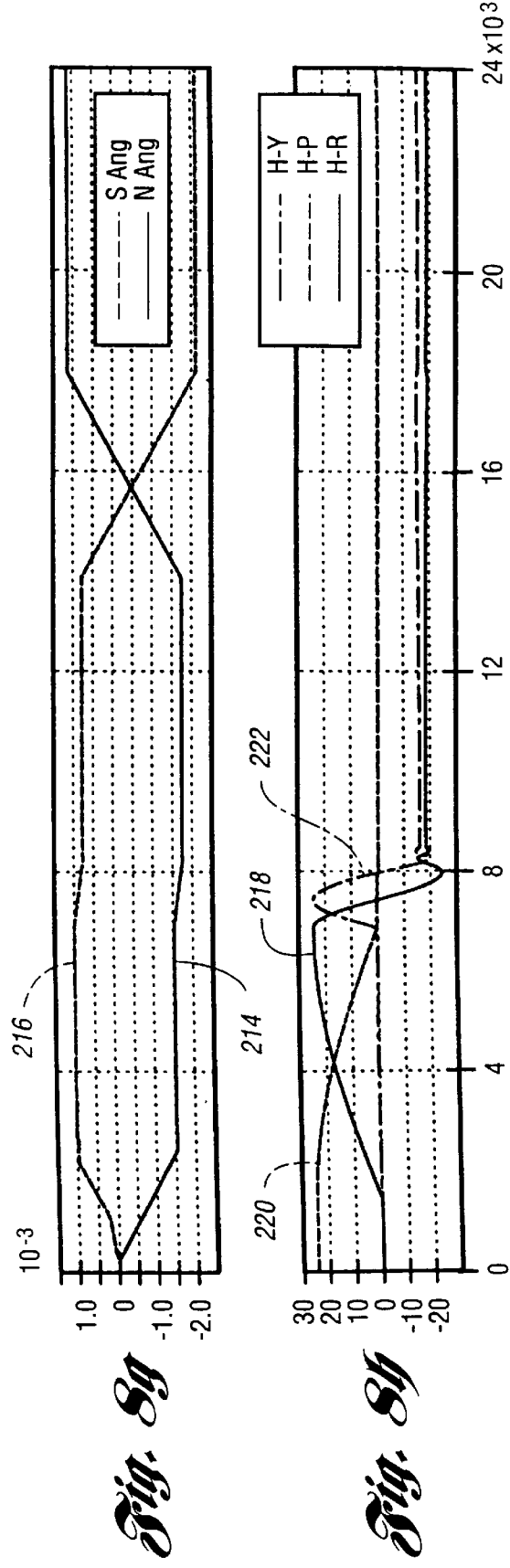

SLEW RATE DIRECTION DETERMINATION FOR ACQUISITION MANEUVERS USING REACTION WHEELS

TECHNICAL FIELD

The present invention relates to performing autonomous acquisition by a spacecraft under reaction wheel control.

BACKGROUND ART

Throughout the life of a spacecraft, attitude modifications are made to carry out mission objectives, to determine orientation, and to correct for undesired torques. In order to minimize expendable fuel in slewing maneuvers, reaction wheel systems are used to transfer rotational momentum to and from the satellite body.

In certain maneuvers such as, for example, sun acquisition, large attitude changes impose tremendous challenges upon a reaction wheel system due to the sun acquisition time constraint as well as the wheel momentum saturation. If wheel saturation occurs during slew maneuvers, the path actually traced by the spacecraft will differ from the ideal path. This may result in failure to acquire the sun. If a fixed slew rate is used to perform the maneuver, the rate must be slow enough not to saturate the reaction wheel system throughout a wide range of initial momentum states. This may lengthen the sun acquisition time significantly and fail to meet the power safe time constraint requirements.

What is needed is a method and system for determining slew rate and direction that will avoid momentum wheel system saturation while generating maximum maneuver rates so that acquisition time limit requirements can be met. The spacecraft should be able to perform the maneuver autonomously.

SUMMARY OF THE INVENTION

As such, one object of the present invention is to determine slew rate and direction without causing momentum wheel system saturation.

Another object of the present invention is to determine maximum rates so that acquisition times can be met.

Yet another object of the present invention is to autonomously determine slew rate and direction for momentum wheel maneuvers.

In carrying out the above objects and other objects and features of the present invention, a method is provided for slewing a spacecraft about a desired axis using a reaction wheel system. The method includes determining the spacecraft total angular momentum and the availability of each reaction wheel in the reaction wheel system. A momentum storage threshold is determined using the reaction wheel availability. If the total angular momentum is greater than the momentum storage threshold, the method is halted. Otherwise, the available momentum is determined based on the total angular momentum and the availability of each reaction wheel. A slew rate magnitude and a slew direction are found based on the available momentum. Finally, the spacecraft is slewed about the desired slew axis at the slew rate magnitude in the slew rate direction.

In one embodiment, each wheel in the reaction wheel system has a maximum single wheel capacity, and the reaction wheel system configuration is described through a geometrical relation. Determining the momentum storage threshold further uses the maximum single wheel capacity and the geometrical relation. In a further refinement, the reaction wheel system has maximum momentum storage capacities dependent on direction in momentum space. Determining the momentum storage threshold includes determining a polyhedron in momentum space describing the maximum momentum in any direction, the polyhedron based on the availability of each reaction wheel, the maximum single wheel capacity, and the geometrical relation. The largest sphere that can be inscribed within the polyhedron is found. The momentum storage threshold is set to the radius of the sphere.

In another embodiment, determining available momentum includes determining the greatest distance from the total angular momentum of the spacecraft to the farthest edge of the polyhedron envelope along a line parallel to the slew axis in momentum space. Additional embodiments include uniformly decreasing the momentum envelope by an overhead momentum margin, decreasing the momentum envelope by removing a momentum trapping margin from each polyhedron vertex that lies on the slew axis, and setting the available momentum to a momentum lower bound if the available momentum is less than the momentum lower bound.

In a further embodiment, the slew rate magnitude is found as the ratio of the available momentum to spacecraft moment of inertia about the slew axis and the slew direction is found as the sign of the total angular momentum component along the slew axis of rotation.

A system is also provided in accordance with the present invention for slewing a spacecraft about a desired axis. The system includes a reaction wheel system within the spacecraft body, at least one sensor operative to detect the total rotational momentum of the spacecraft, and a control logic within the spacecraft. The control logic is operative to determine a total angular momentum of the spacecraft, determine availability of each reaction wheel in the reaction wheel system, determine a momentum storage threshold using the reaction wheel availability, and, if the total angular momentum is not greater than the momentum storage threshold, determine available momentum based on the total angular momentum and the availability of each reaction wheel. If the total angular momentum is greater than the momentum storage threshold, the slew maneuver is aborted. Otherwise, the control logic is further operative to determine a slew rate magnitude and a slew direction based on available momentum, and to slew the spacecraft about the desired slew axis at the slew rate magnitude in the slew rate direction.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
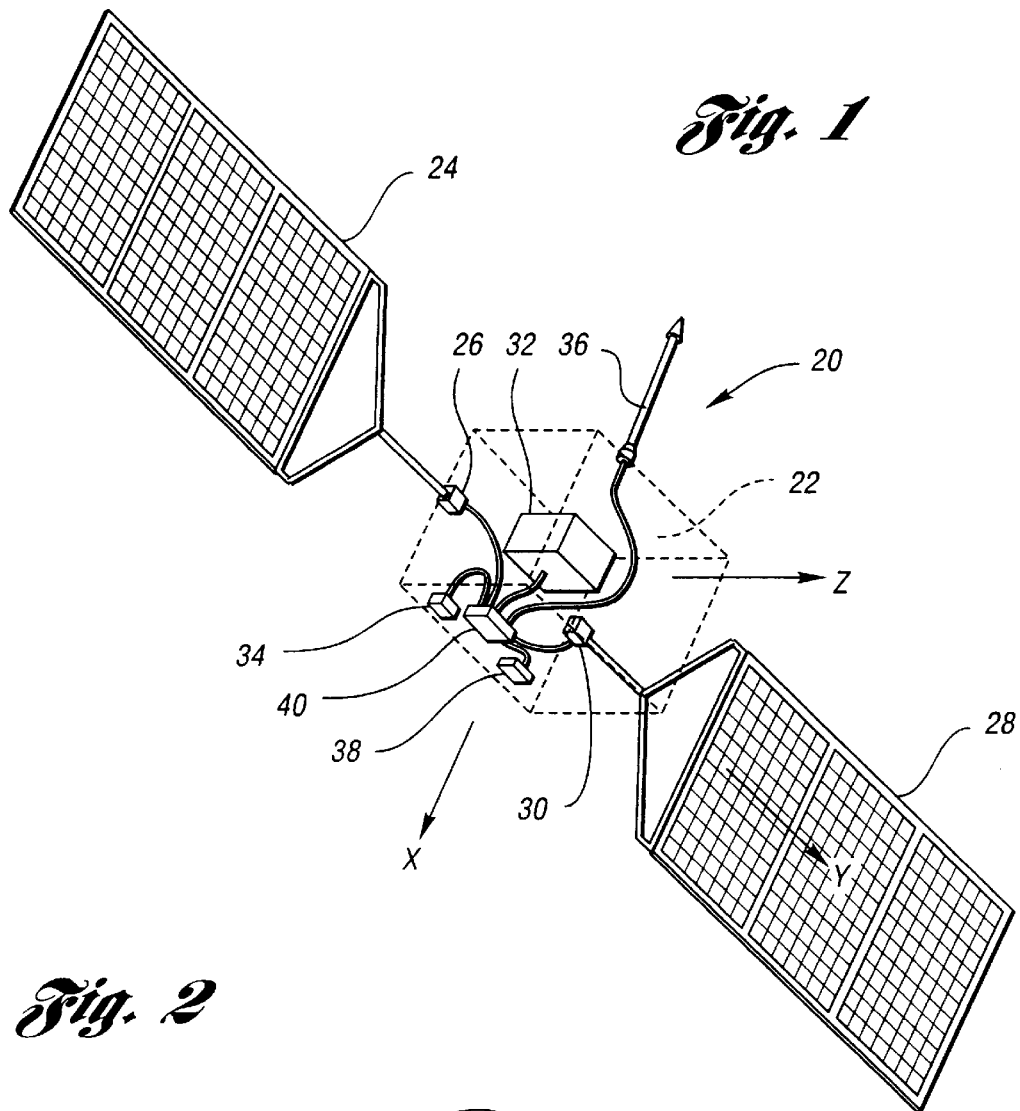
FIG. 1 is a graphical representation of a spacecraft that may use the method according to the present invention.

Referring now to FIG. 1, a graphical representation of a spacecraft for using the present invention is shown. A spacecraft, shown generally as 20, has body 22. An orthonormal body frame is indicated by the X or roll axis, Y or pitch axis, and Z or yaw axis.

North solar wing 24 is rotatively attached to the north or −Y face of body 22 through north solar wing drive 26. North solar wing drive 26 is operative to rotate north solar wing 24 relative to body 22. South solar wing 28 is rotatively attached to the south or +Y face of body 22 through south solar wing drive 30. South solar wing drive 30 is operative to rotate south solar wing 28 relative to body 22. Solar cells, not shown for clarity, may be attached to north solar wing 24 and south solar wing 28.

Spacecraft 20 includes reaction wheel system 32 to exchange rotational momentum between the wheels and body 22 so as to modify the attitude of spacecraft 20. A typical reaction wheel system is described with regards to FIG. 2 below. Spacecraft 20 may also include thrusters, not shown for clarity, to drive attitude and position changes.

In one embodiment, sun sensor 34 is attached to spacecraft body 22 with the sensor boresight in the X-Z plane and rotated 50 degrees from the +Z axis towards the +X axis. Sun sensor 34 may be a wide field of view sun sensor assembly (SSA). In another embodiment, sun position is obtained by slewing solar wings 24 and 28 until a maximum current is obtained from the solar cells. The position of wings 24 and 28 relative to body 22 indicate a projection of the sun vector onto the roll-yaw plane.

Spacecraft 20 may also include antenna 36 for T&C communication with a ground station not shown. A set of three-axis gyroscopes 38 senses changes in attitude. Control logic 40, in communication with north solar wing drive 26, south solar wing drive 30, reaction wheel system 32, sun sensor 34, antenna 36, and gyroscopes 38, accepts input from sensors and produces signals to actuators so as to accomplish the present invention.

Figure 2:
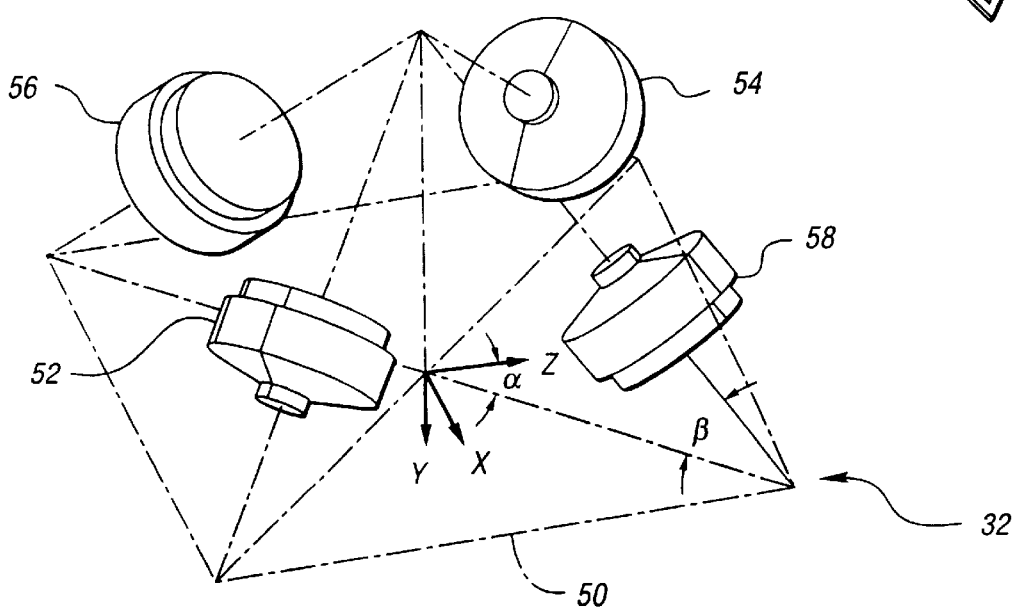
FIG. 2 is a graphical representation of a reaction wheel assembly pyramid that may be used by the method according to the present invention.

Referring now to FIG. 2, a graphical representation of reaction wheel assembly pyramid that may be used by the method according to the present invention is shown. Reaction wheel system 32 includes reaction wheel assembly 50.

In a preferred embodiment, reaction wheel assembly 50 includes reaction wheel one (RW1) 52, reaction wheel two (RW2) 54, reaction wheel three (RW3) 56, and reaction wheel four (RW4) 58. The reaction wheels are arranged such that the axes of rotation form the slant edges of a right regular pyramid. That is, the base of the pyramid formed by the axes of rotation is a square. Note that the projection of the axes of rotation for wheels on opposite side of the pyramid onto the base are collinear. Typically, the pyramid would be oriented such that the base is normal to solar wing 24,28 axis of rotation. For spacecraft 20 shown in FIG. 1, the base of the pyramid lies in the X-Z plane. The base is rotated an angle α, typically 45 degrees, from the Z axis. The altitude, or height, of the pyramid is parallel to the Y axis. The angle of elevation, β, determines the height of the pyramid. The angle of elevation is a geometrical relation describing the configuration of reaction wheel assembly 50. In an illustrative example, β is 45 degrees.

Each wheel in reaction wheel assembly 50 may be spun in either direction, independently of other wheels, up to a maximum velocity. The maximum velocity determines the saturation momentum for the wheel. The vector sum of momenta stored in all wheels represents the total angular momentum stored in reaction wheel assembly 50.

Figure 3:
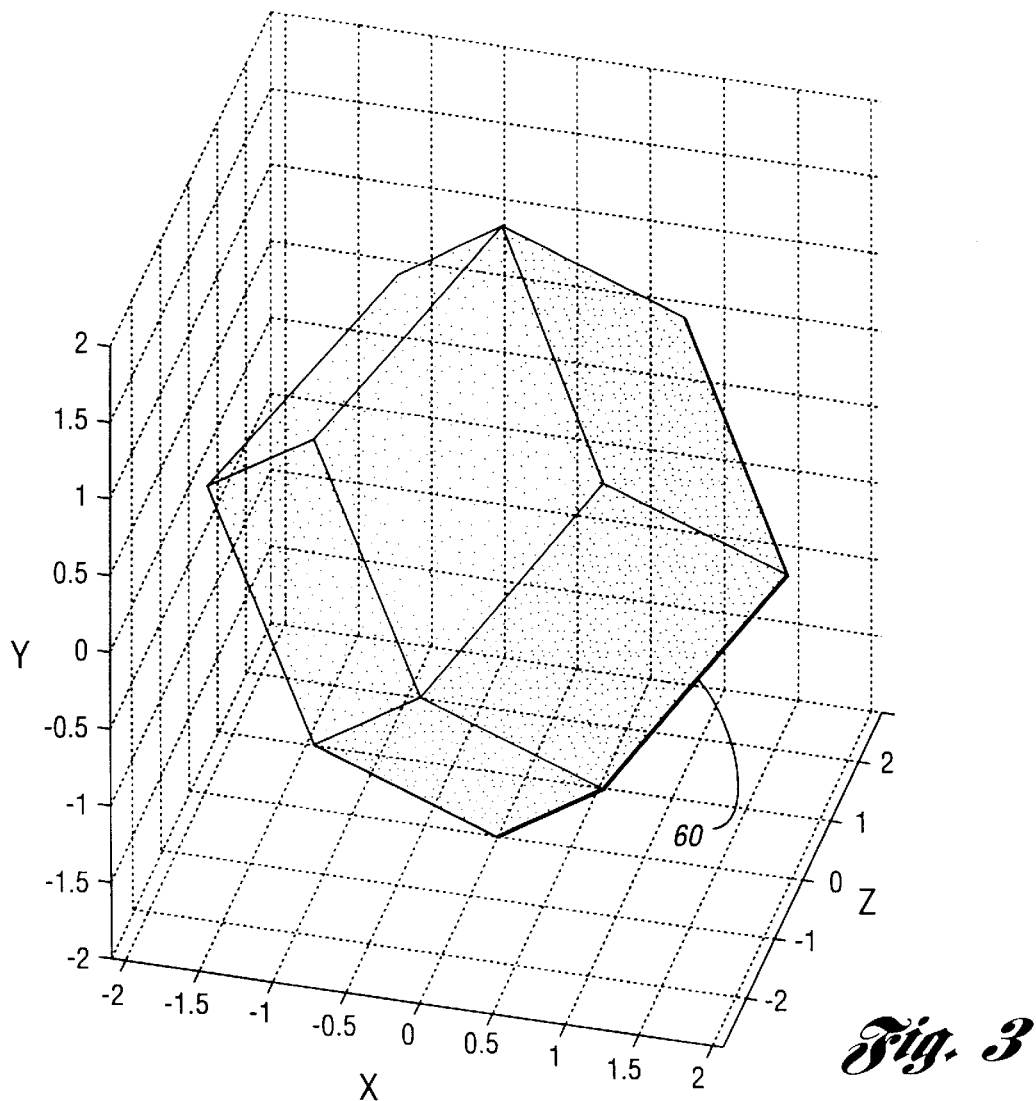
FIG. 3 is an exemplary plot of momentum storage capacities for the reaction wheel assembly pyramid described with regards to FIG. 2.

Referring now to FIG. 3, an exemplary plot of momentum storage capacities for the reaction wheel assembly pyramid described with regards to FIG. 2 above is shown. The volume contained in polyhedron 60 represents the set of all momentum vectors which can be stored by a 4-wheel pyramid. The plot is for reaction wheel assembly 50 having an angle of elevation, β, of 45° and having all four wheels in operation.

Figure 4:
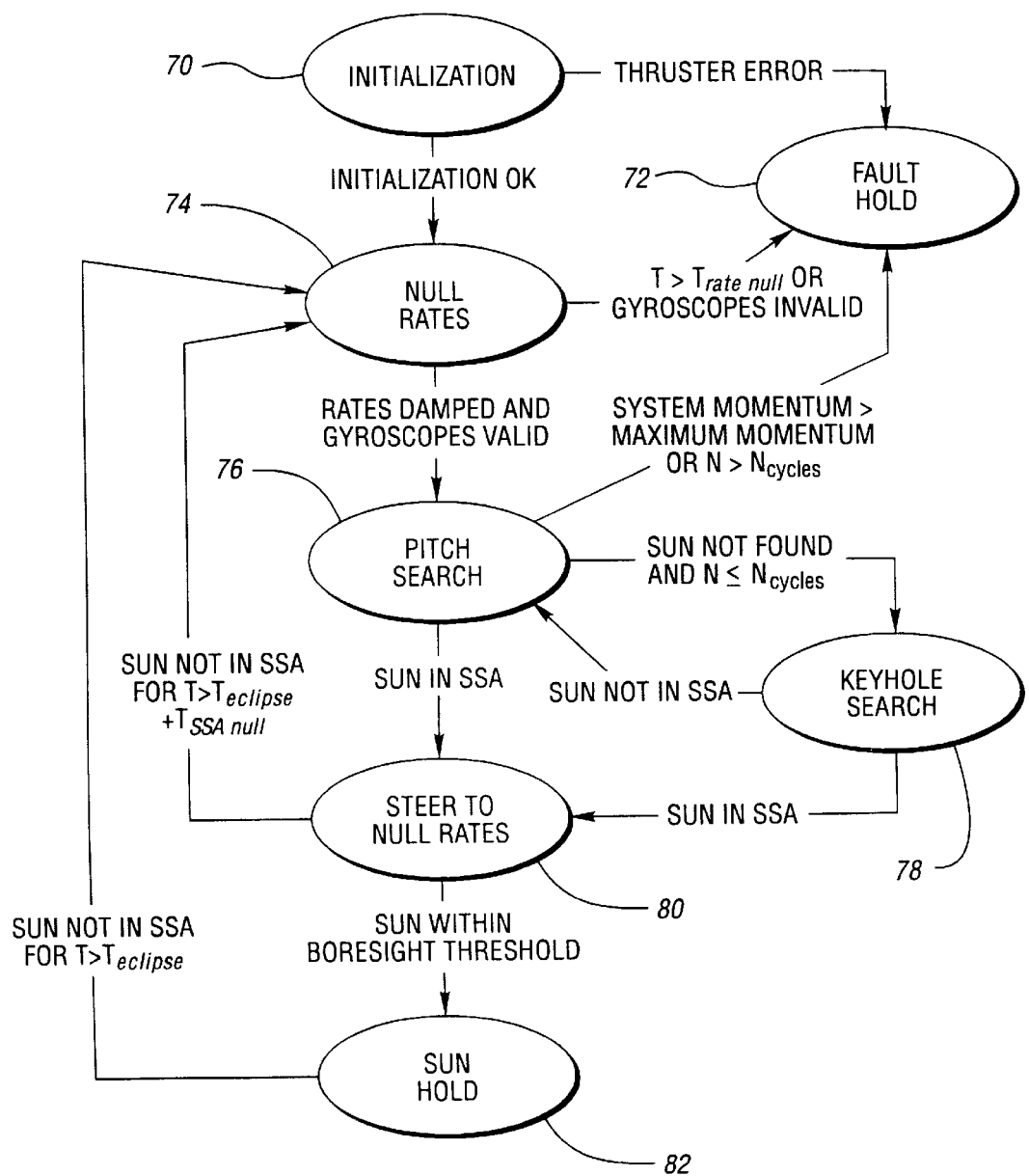
FIG. 4 is a state diagram showing a common sun acquisition sequence that may initiate the method of the present invention.

Referring now to FIG. 4, a state diagram showing a common sun acquisition sequence that may initiate the method of the present invention is shown. Spacecraft 20 may be commanded to acquire a sun-pointing attitude. Initialization state 70 is used to set steering to inertial and initialize the sequence. During initialization faults may occur such as, for example, receiving sensor indications that a thruster valve is closed after a command to enable thrusters. In this case, fault hold state 72 is entered. If initialization is successful, null rates state 74 is entered.

Null rates state 74 is used to null residual rates, initiate solar wing 24,28 sun search, and monitor the validity of gyroscopes 38. If a time greater than the null rate time $T_{rate\ null}$ is required or if gyroscopes 38 produce invalid readings, fault hold state 72 is entered. If rates are damped within $T_{rate\ null}$ and gyroscopes are operating properly, a pitch search is initiated.

Pitch search state 76 is used to slew spacecraft 20 about the pitch axis. If the sun is not found by sun sensor 34, the sun is assumed to be roughly aligned with the Y axis, in which case a keyhole search is performed. If the sun is located by sun sensor 34, the position of the sun has been determined and spacecraft 20 is steered to center the sun in the SSA. If the momentum of spacecraft 20 exceeds the maximum momentum allowed by reaction wheel system 32, fault hold state 72 is entered. Fault state 72 is also entered if the number of cycles N between pitch search and keyhole search exceeds a constant $N_{cycles}$.

Keyhole search state 78 is used to perform a keyhole search. Spacecraft 20 is rotated about an axis perpendicular to the pitch axis through an angle of approximately 90 degrees to move the sun off the pitch axis. If the sun appears in sun sensor 34 while performing the keyhole search, the spacecraft is steered to center the sun in sun sensor 34. If not, a pitch search is performed.

Steer to null SSA state 80 is used to slew spacecraft 20 in order to bring the sun within the boresight of sun sensor 34 and rates are nulled. If successful, sun hold state 82 is entered. If acquisition is not accomplished within a set time period, null rates state 74 is entered. The time allowed is the sum of the eclipse time, $T_{eclipse}$, which allows for time during which the sun is blocked by a celestial body such as the earth, and the time required to perform the steer to null SSA slew, $T_{SSA\ null}$.

Sun hold state 82 holds the sun in sun sensor 34. If the sun is not in view for a length of time greater than $T_{eclipse}$, null rates state 74 is entered.

Fault hold state 72 is entered if a fault condition occurs during sun acquisition. While in fault hold, spacecraft 20 is kept in a safe hold state.

Figure 5:
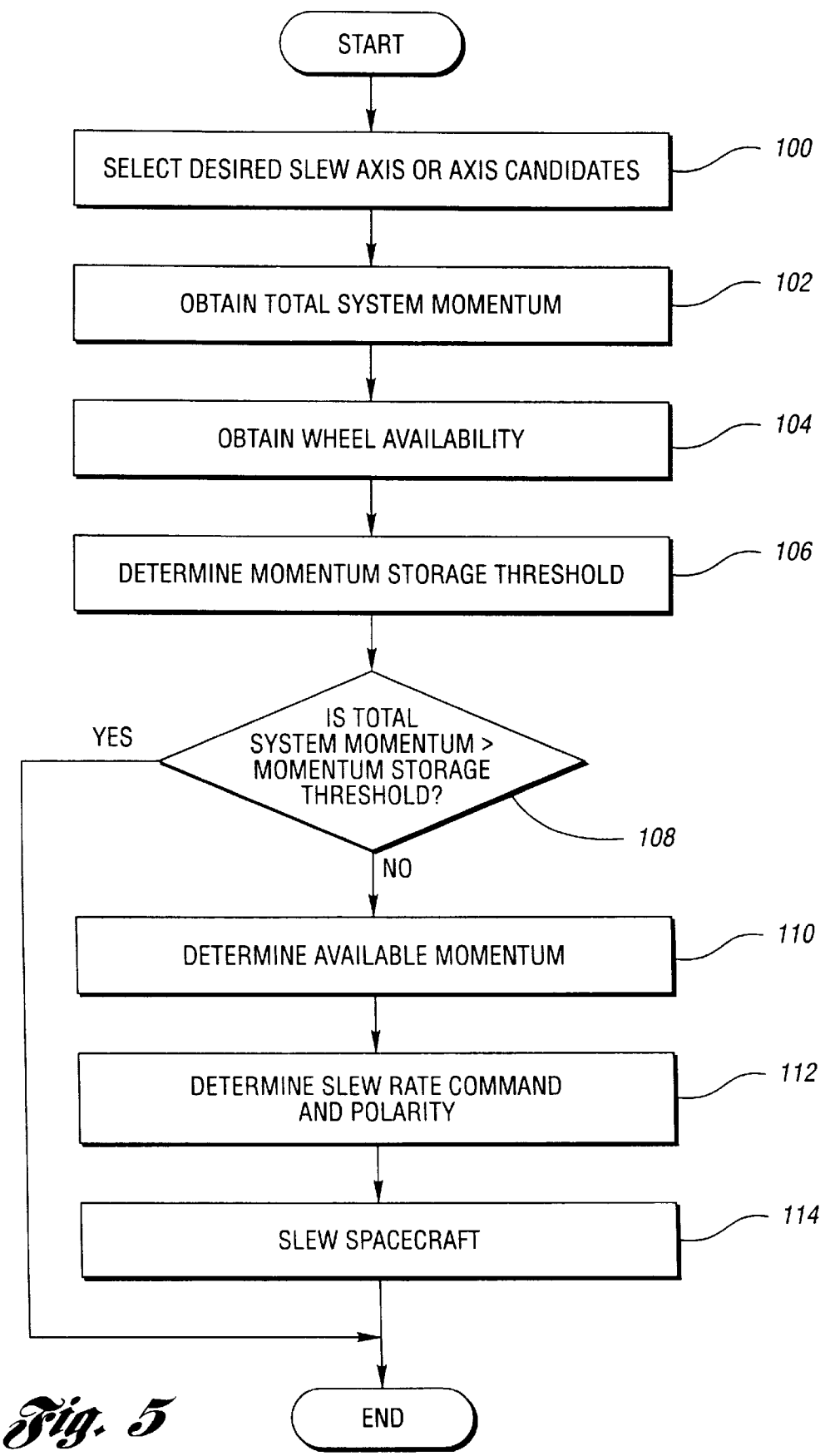
FIG. 5 is a flow diagram representing operation of a system or method according to the present invention.

Referring now to FIG. 5, a flow diagram representing operation of a system or method according to the present invention is shown. As will be appreciated by one of ordinary skill in the art, the operations illustrated are not necessarily sequential operations. Similarly, operations may be performed by software, hardware, or a combination of both. The present invention transcends any particular implementation and is shown in a sequential flow chart form for ease of illustration.

A desired slew axis is selected in block 100. For pitch search, pitch axis is selected. For keyhole search, both roll and yaw are selected as candidates for the slew.

Total system momentum is obtained in block 102. The momentum of the total system, $\hat{H}_{tot}$, includes the momentum of spacecraft body 22, reaction wheel system 32, and appendages such as solar wings 24,28. The total system momentum can be expressed as the momenta about roll, pitch, and yaw $$\hat{H}_{tot} = H_1\hat{x} + H_2\hat{y} + H_3\hat{z} \quad (1)$$

where $\hat{x}$, $\hat{y}$, and $\hat{z}$ are unit vectors for roll, pitch, and yaw.

Wheel availability is obtained in block 104. The method of the present invention covers the case for all wheels in reaction wheel assembly 50 in operation as well as for the case covering any single wheel failure. A check is made to determine which wheels are in operation.

The momentum storage threshold is determined in block 106. The momentum storage threshold is found by inscribing the largest possible sphere contained within momentum polyhedron 60. The radius of this sphere, $R_s$, is the momentum storage threshold. For the case in which all four reaction wheels are in operation, the radius is $$R_s = \begin{cases} \dfrac{h_w}{\sin\beta}, & \text{if } \sin\beta \geq \dfrac{1}{\sqrt{3}} \\ \dfrac{4h_w\sin\beta}{1+\sin^2\beta}, & \text{if } \sin\beta < \dfrac{1}{\sqrt{3}} \end{cases} \quad (2)$$

where $h_w$ is the maximum single wheel momentum. For the case in which one wheel has failed, the momentum storage threshold is $$R_s = \begin{cases} \dfrac{h_w}{2\sin\beta}, & \text{if } \sin\beta \geq \dfrac{1}{\sqrt{3}} \\ \dfrac{2h_w\sin\beta}{1+\sin^2\beta}, & \text{if } \sin\beta < \dfrac{1}{\sqrt{3}} \end{cases} \quad (3)$$

For example, if β is 45°, then sin 45°=1/√3, and the four wheel case yields $R_s = \sqrt{2}h_w$. The corresponding three wheel case yields $R_s = \sqrt{2}/2\, h_w$.

The total system momentum is compared to the momentum storage threshold in block 108. If the total system momentum is greater than the momentum storage threshold, the slewing maneuver is aborted. In the sun acquisition sequence described with regards to FIG. 4 above, fault hold state 72 is entered and spacecraft 20 is kept in a safe hold state. If the total system momentum is not greater than the storage threshold, the available momentum is determined.

Available momentum is determined in block 110. The available momentum is the momentum in reaction wheel system 32 for executing a 360° slew about the desired slew axis without causing saturation of any wheel in reaction wheel assembly 50.

The available momentum is found by inscribing a cone within polyhedron 60, the cone being symmetric about the slew axis. The cone defines a set of momenta which can be precessed 360° by reaction wheel system 32 during the slew.

For the case where all four wheels are operative, the available momentum for a slew about roll axis $\hat{u}=[1\ 0\ 0]$ is $$h_{slew,1} = \quad (4)$$
$$\begin{cases} |H_1| + 2\sqrt{2}\,h_w\cos\beta - \dfrac{1}{\sqrt{2}\tan\beta}\sqrt{H_2^2+H_3^2}, & \text{if } \tan\beta < \dfrac{1}{\sqrt{2}} \\ |H_1| + 2\sqrt{2}\,h_w\cos\beta - \sqrt{H_2^2+H_3^2}, & \text{if } \tan\beta \geq \dfrac{1}{\sqrt{2}} \end{cases}$$

The available momentum for a slew about pitch axis $\hat{u}=[0\ 1\ 0]$ is $$h_{slew,2} = |H_2| + 4h_w\sin\beta - \sqrt{2}\tan\beta\sqrt{H_1^2+H_3^2} \quad (5)$$

The available momentum for a slew about yaw axis $\hat{u}=[0\ 0\ 1]$ is $$h_{slew,3} = \quad (6)$$
$$\begin{cases} |H_3| + 2\sqrt{2}\,h_w\cos\beta - \dfrac{1}{\sqrt{2}\tan\beta}\sqrt{H_1^2+H_2^2}, & \text{if } \tan\beta < \dfrac{1}{\sqrt{2}} \\ |H_3| + 2\sqrt{2}\,h_w\cos\beta - \sqrt{H_1^2+H_2^2}, & \text{if } \tan\beta \geq \dfrac{1}{\sqrt{2}} \end{cases}$$

For the case where one wheel is inoperative, the available momentum for a slew about roll axis $\hat{u}=[1\ 0\ 0]$ is $$h_{slew,1} = \begin{cases} |H_1| + \sqrt{2}\,h_w\cos\beta - \dfrac{1}{\sqrt{2}\tan\beta}\sqrt{H_2^2+H_3^2}, & \text{if } \tan\beta < \dfrac{1}{\sqrt{2}} \\ |H_1| + \sqrt{2}\,h_w\cos\beta - \sqrt{H_2^2+H_3^2}, & \text{if } \tan\beta \geq \dfrac{1}{\sqrt{2}} \end{cases} \quad (7)$$

The available momentum for a slew about pitch axis $\hat{u}=[0\ 1\ 0]$ is $$h_{slew,2} = |H_2| + 2h_w\sin\beta - \sqrt{2}\tan\beta\sqrt{H_1^2+H_3^2} \quad (8)$$

The available momentum for a slew about yaw axis $\hat{u}=[0\ 0\ 1]$ is $$h_{slew,3} = \begin{cases} |H_3| + \sqrt{2}\,h_w\cos\beta - \dfrac{1}{\sqrt{2}\tan\beta}\sqrt{H_1^2+H_2^2}, & \text{if } \tan\beta < \dfrac{1}{\sqrt{2}} \\ |H_3| + \sqrt{2}\,h_w\cos\beta - \sqrt{H_1^2+H_2^2}, & \text{if } \tan\beta \geq \dfrac{1}{\sqrt{2}} \end{cases} \quad (9)$$

If β is 45° in reaction wheel assembly 50, equations (4) through (9) can be expressed as $$h_{slew} = |\hat{u} \cdot \hat{H}_{tot}| + k_1 h_w - k_2 \sqrt{(\hat{H}_{tot} \cdot \hat{H}_{tot}) - (\hat{u} \cdot \hat{H}_{tot})} \quad (10)$$

where $\hat{u}$ is the slew axis and the constants $k_1$ and $k_2$ are defined in Table 1.

TABLE 1

| Slew Axis | $k_1$, 4 wheels | $k_2$, 4 wheels | $k_1$, 3 wheels | $k_2$, 3 wheels |
|---|---|---|---|---|
| Roll | 2 | 1 | 1 | 1 |
| Pitch | $\sqrt{2}$ | $\sqrt{2}$ | $\sqrt{2}$ | $\sqrt{2}$ |
| Yaw | 2 | 1 | 1 | 1 |

Figure 6:
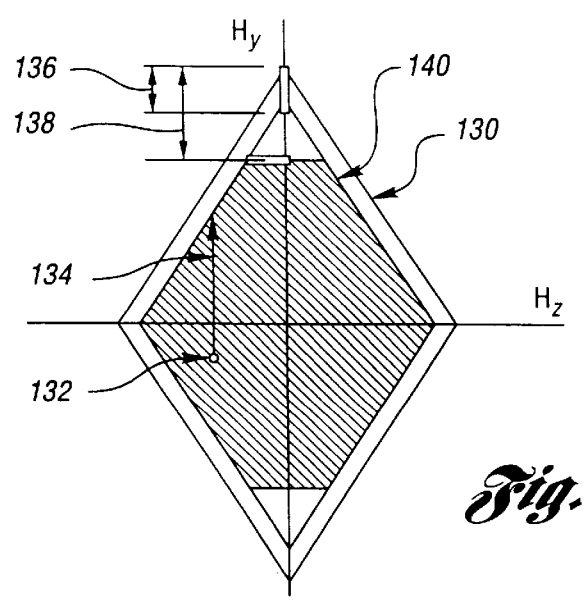
FIG. 6 is an exemplary plot of available momentum about the pitch axis indicating modifications to maximum available momentum.

Referring now to FIG. 6, an exemplary plot of available momentum about the pitch axis indicating modifications to maximum available momentum is shown. The maximum available momentum is modified by predefined constants to accommodate noise and model uncertainties, prevent the momentum vector from being trapped in the momentum cone vertex, and avoid numerical problems.

In FIG. 6, a cross section of polyhedron 60 in the momentum pitch-yaw plane is shown. In this view, the polyhedron envelope is indicated by 130. The initial momentum of the total system, $\hat{H}_{tot}$, is shown as 132. A slew about the Y axis is desired. Since the momentum before saturation is greater for a positive pitch rotation than for a negative pitch rotation, a positive pitch rotation is chosen as indicated by available momentum vector 134.

Polyhedron envelope 130 is decreased by an overhead momentum margin, 6, shown as 136. Overhead momentum margin 136 allows for a level of noise and model uncertainties by decreasing the available momentum.

Another limit, momentum trapping margin $h_{lim}$, shown as 138, is imposed to prevent a slew causing the total angular momentum to fall near the momentum cone vertex. A total angular momentum near the vertex limits the options for subsequent slews. For example, suppose the desired pitch slew is to be followed by a yaw slew, and that the pitch slew results in a total angular momentum near the vertex. The available momentum for the following yaw slew would be the distance in the Z direction to envelope 130 less overhead momentum margin 136. This low momentum value would result in an unacceptably slow yaw slew. The combination of overhead momentum margin 136 and momentum trapping margin 138 results in $h_{slew}$ envelope 140, shown as the shaded region in FIG. 6, within which are allowable values for $h_{slew}$.

A third constant is momentum lower bound $h_{slew\_min}$. If the calculated available momentum is less than the momentum lower bound, the momentum lower bound is used. This avoids numerical calculation difficulties.

An expression for the magnitude of available momentum, $h_{slew}$, is $$h_{slew} = |\hat{u} \cdot \hat{H}_{tot}| + h_a \quad (11)$$

where the first term in the sum represents the change in momentum required to bring the component of total angular momentum in the slew direction to zero and the second term, $h_a$, represents the additional allowable momentum. For the case where $\beta$ is 45°, the term $h_a$ is described in Equation (12).

$$\text{let } B = k_1 h_w - k_2 \sqrt{(\hat{H}_{tot} \cdot \hat{H}_{tot}) - (\hat{u} \cdot \hat{H}_{tot})} - \delta \quad (12)$$

$$h_a = \begin{cases} h_{slew\_min} & \text{if } B < h_{slew\_min} \\ k_1 h_w - k_2 h_{lim} & \text{if } B > k_1 h_w - k_2 h_{lim} \\ B & \text{otherwise} \end{cases}$$

Referring again to FIG. 5, slew rate command and polarity are determined in block 112. Rotational momentum is the product of moment of inertia and the slew vector. Since the magnitude of the slew has been found as $h_{slew}$, the maximum slew rate and direction without saturating wheels in reaction wheel system 32 can be found in slew vector $\vec{\omega}$ defined as $$\vec{\omega} = \text{sgn}(\hat{u} \cdot \hat{H}_{tot}) \frac{h_{slew}}{(\hat{u} \cdot I_{sc}) \cdot \hat{u}} (\hat{u}) \quad (13)$$

where $I_{sc}$ is the inertial matrix for spacecraft 20.

For certain maneuvers, such as in keyhole search state 78 where the slew may be about roll or yaw, more than one axis of rotation exists. In these cases, the axis resulting in the higher slew rate will be chosen as the slew axis.

The spacecraft is slewed in block 114. Spacecraft 20 is slewed about axis $\hat{u}$ at a speed of $|\vec{\omega}|$ and in the direction of $\text{sgn}(\hat{u} \cdot \hat{H}_{tot})$.

Figure 7:
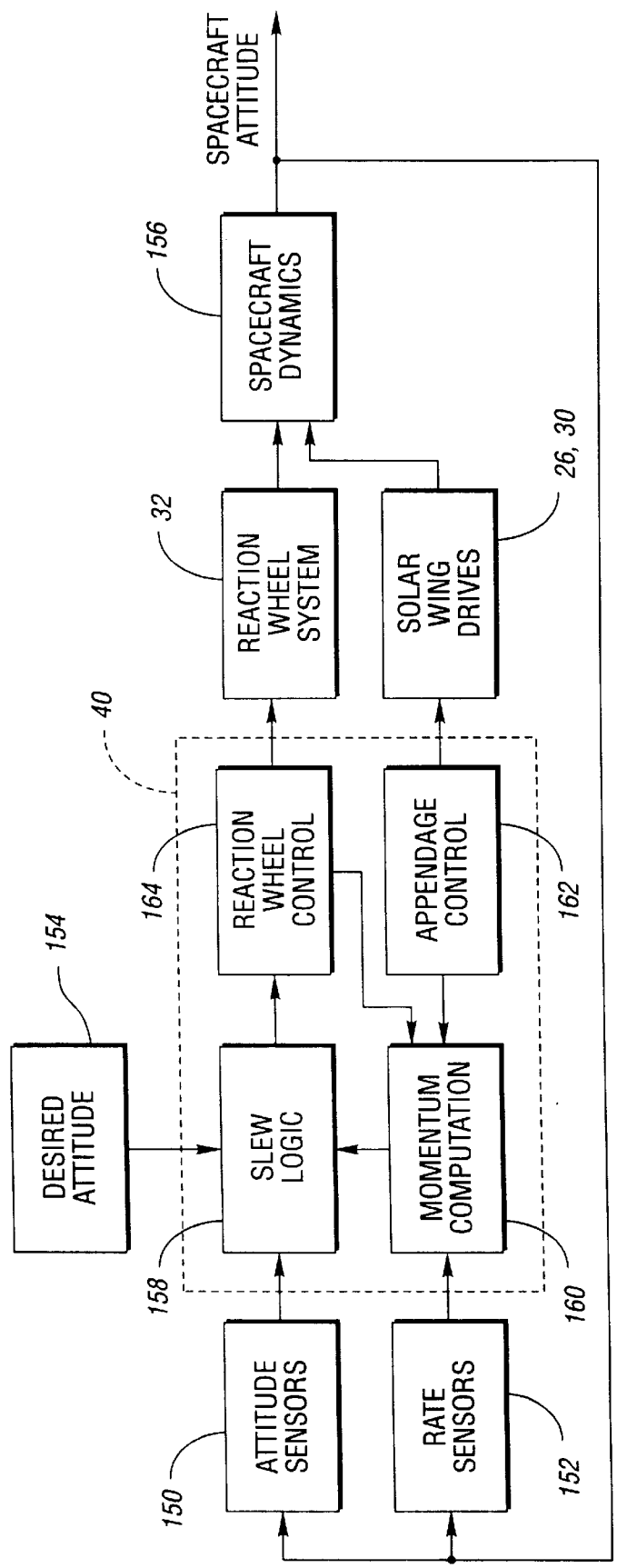
FIG. 7 is a block diagram of a control arrangement for effecting a spacecraft maneuver in accordance with the present invention.

Referring now to FIG. 7, a block diagram of a control arrangement for effecting a spacecraft maneuver in accordance with the present invention is shown.

Control logic 40 accepts attitude measurements from attitude sensors, shown generally as block 150, rotational rate measurements from rate sensors, shown generally as block 152, and desired attitude signals, shown as block 154. The desired attitude signals may be commanded from a ground station not shown or may be produced from an on-board algorithm. Control logic 40 develops wheel torque commands for reaction wheel system 32. These commands create wheel torques that modify the attitude of spacecraft 20 through spacecraft dynamics, shown generally by block 156. Control logic 40 also develops wing torque commands for solar wing drives 26,30. These commands rotate solar wings 24,28 relative to spacecraft body 22.

Within control logic 40, slew logic 158 accepts measured attitudes from attitude sensors 150, desired attitudes 154, and spacecraft total angular momentum from momentum computation 160, and determines a slew rate and direction as described with regards to FIG. 5 above. Momentum computation 160 uses spacecraft rate measurements from rate sensors 152, appendage rates from appendage control 162, and wheel rates from reaction wheel control 164 to determine the total angular momentum. Reaction wheel control 164 uses slew rate and direction from slew logic 158 to determine wheel torque commands.

Simulation Results

The performance of the present invention was validated through ADSIM simulation for a typical spacecraft. Spacecraft 20 is modeled as a five-panel rigid body having a configuration as described with regards to FIG. 1 above. Reaction wheel system 32 has reaction wheel assembly 50 as described with regards to FIG. 2 above with base rotation angle $\alpha$ of 45 degrees, angle of elevation $\beta$ of 45 degrees, with RW1 52 failed, and with RW2 54, RW3 56 and RW4 58 having momentum saturation occurring at a wheel speed of 5,200 revolutions per minute (RPM). The maximum momentum threshold with RW1 52 failed is approximately 28 Newton-meter-seconds (Nms).

The simulation shows approximately 400 minutes of time. Initially, the sun is along the body pitch axis (−Y axis) and spacecraft 20 has a momentum vector with a magnitude of 24 Nms and +Y direction. These initial conditions represent a particularly difficult situation.

Figure 8A:
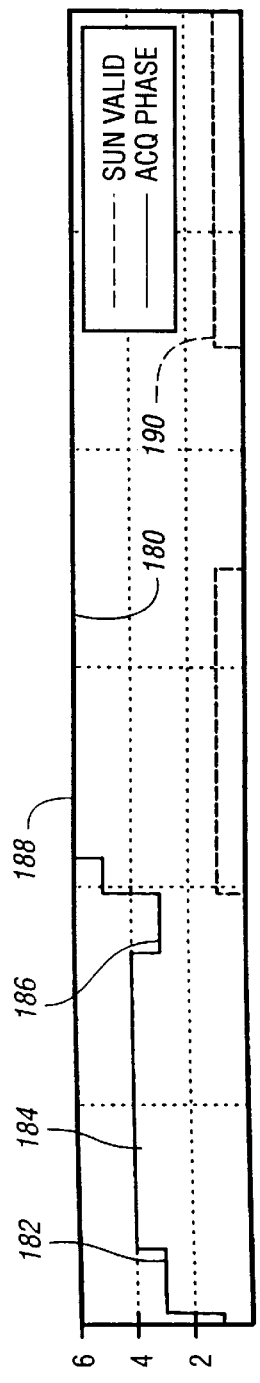
FIGS. 8 through 8H are plots showing simulation results of spacecraft parameters for an illustrative example of the present invention.

Referring now to FIGS. 8A through 8H, plots showing simulation results of spacecraft parameters for an illustrative example of the present invention are shown. FIG. 8A includes a trace indicating simulated acquisition states 180, where 1 is initialization state 70, 2 is null rates state 74, 3 is pitch search state 76, 4 is keyhole search state 78, 5 is steer to null SSA state 80, and 6 is sun hold state 82. At approximately 200 seconds into the simulation, sun acquisition begins. Shortly after initialization, first pitch search, indicated by 182, is executed since rates are null. Since the sun is in the keyhole of spacecraft 20, sun acquisition does not occur and keyhole search state 78 is entered, as indicated by 184. At the end of the keyhole maneuver, the sun has still not been acquired. A second pitch search, indicated by 186, is begun. When the sun is acquired, steer to null SSA state 80 is passed through to sun hold state 82, as indicated by 188.

FIG. 8A also includes sun valid signal 190, with 1 indicating that the sun appears in the filed of view of sun sensor 34 and 0 otherwise. In this example, the sun appears during second pitch search 186. A simulated solar eclipse occurs at approximately 230 minutes into the simulation and lasts for 70 minutes. Since the allowed eclipse time before leaving sun hold state 82 for null rates state 74 is 80 minutes, spacecraft 20 remains in sun hold 188.

Figure 8B:
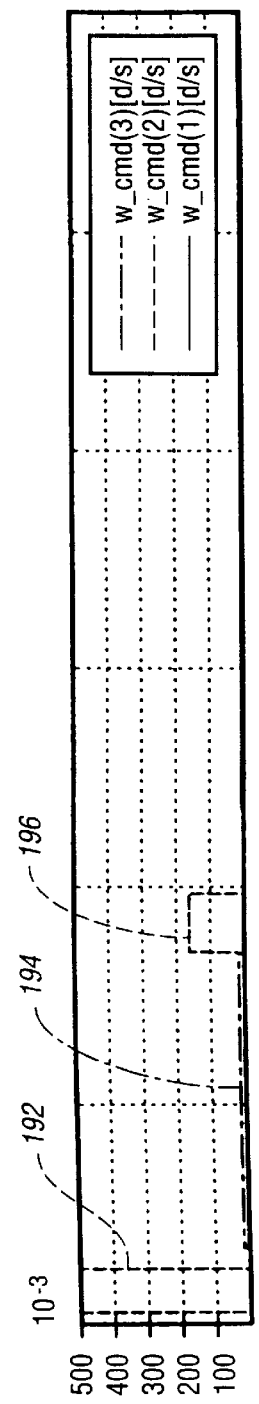

Referring now to FIG. 8B, commanded body slew rates are shown. First pitch search 182 generates first pitch command rate 192 of 0.5 degrees per second (°/s) about the pitch axis. Keyhole search 184 generates keyhole command rate 194 of 0.017 °/s about the yaw axis. Second pitch search 184 generates second pitch command rate 194 of about 0.16 °/s about the pitch axis.

Figure 8C:
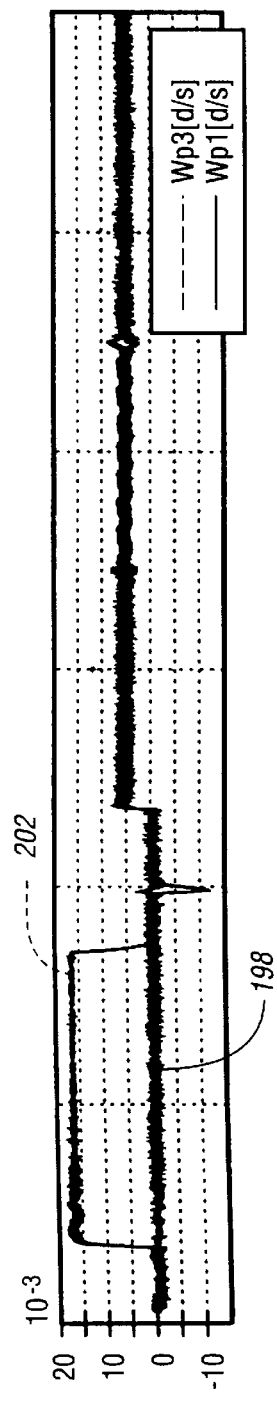
Figure 8D:
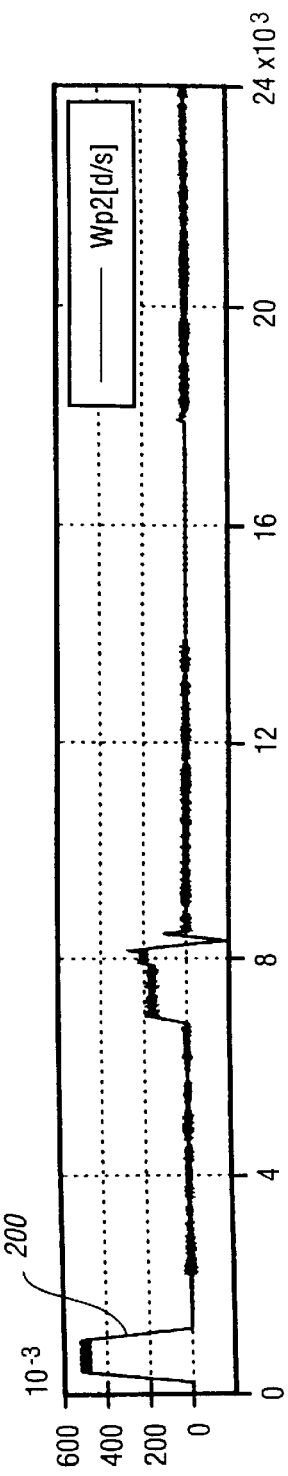
Figure 9A:
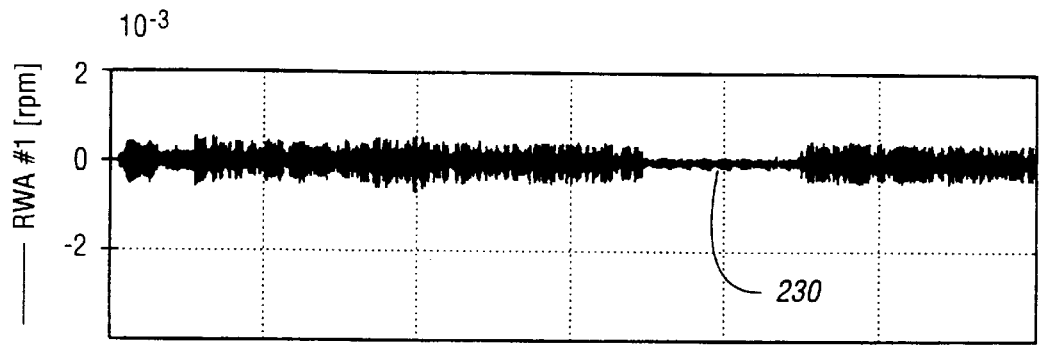
FIGS. 9A through 9D are plots showing simulation results of reaction wheel speeds for an illustrative example of the present invention.
Figure 9B:
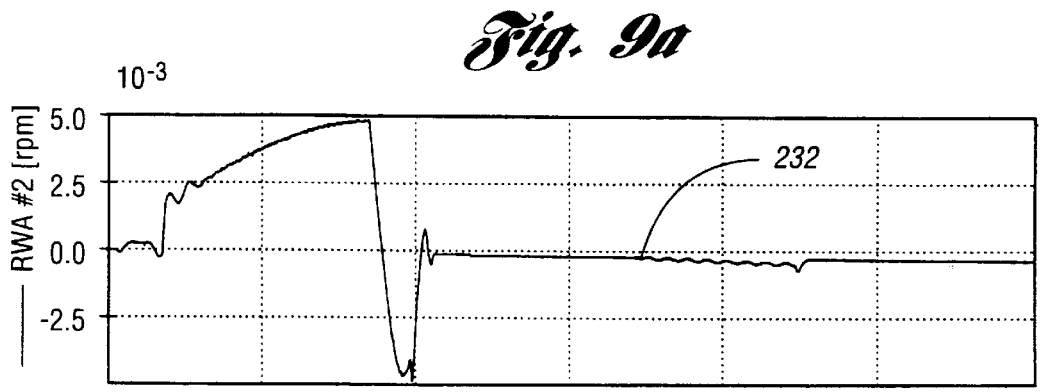
Figure 9C:
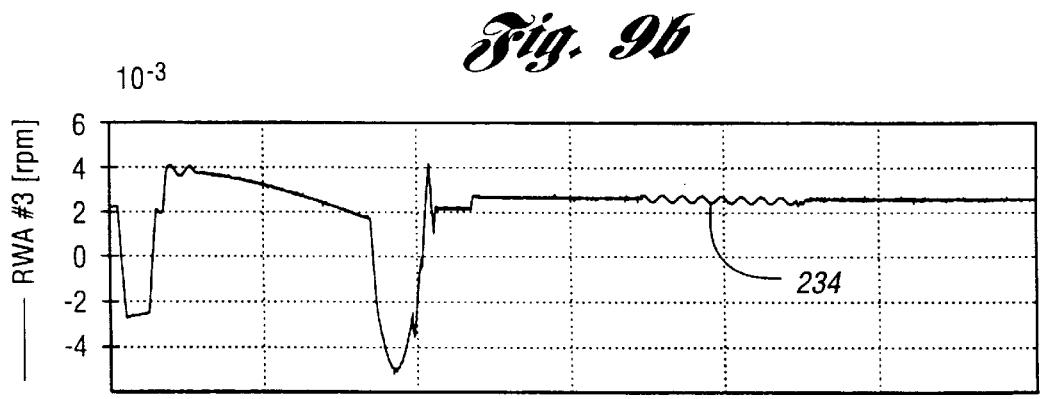
Figure 9D:
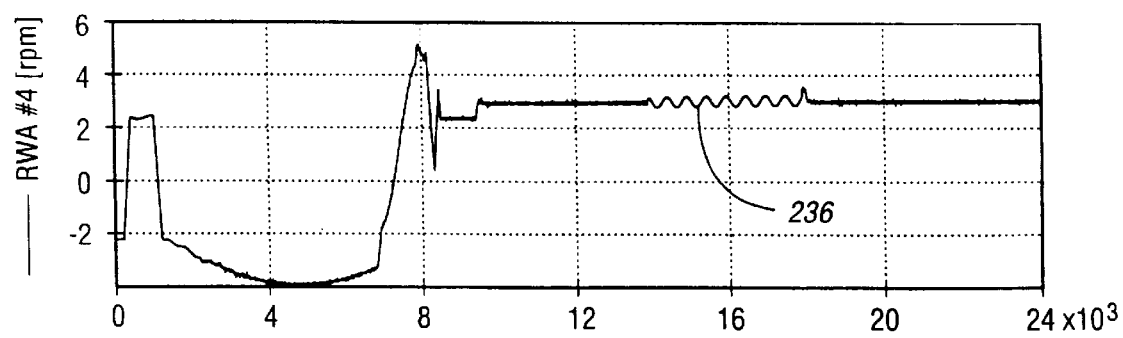

Referring now to FIGS. 8C and 8D, true body rate about the roll axis 198, pitch axis 200, and yaw axis 202 are shown. Throughout sun acquisition, body rates follow commanded rates. During sun hold phase 82, spacecraft 20 is rotated about the boresight of sun sensor 34 at a rate of 0.008 °/s for telemetry and command coverage. Since sun sensor 34 boresight is rotated 500 in the X-Z plane, both roll and yaw rotation is required.

Referring now to FIG. 8E, the sun vector in the body frame is shown. Sun vector X-component 204, sun vector Y-component 206, and sun vector Z-component 208 indicate the position of the sun relative to spacecraft body 22.

Referring now to FIG. 8F, solar wing currents in amperes are shown. North solar wing current 210 and south solar wing current 212 are shown. The drop in current from about 230 minutes through about 300 minutes is due to the simulated eclipse of the sun by the earth. Note that, since north solar wing 24 and south solar wing 28 rotate together, currents 210 and 212 are almost identical.

Referring now to FIG. 8G, solar wing angles in degrees are shown. Once the wings have acquired the sun, north solar wing angle 214 and south solar wing angle 216 make small angular corrections to maximize wing current except during the simulated eclipse when the wings are in solar search mode.

Referring now to FIG. 8H, true system momentum in Newton-meter-seconds is shown. True total momentum about the roll axis 218, true total momentum about the pitch axis 220, and true total momentum about the yaw axis 222 sum to yield the true total system momentum.

Referring now to FIGS. 9A through 9D, plots of simulated wheel speeds in RPM are shown. Wheel 1 speed 230 is essentially zero since wheel one is inoperative in this simulation. Wheel 2 speed 232, wheel 3 speed 234, and wheel 4 speed 236 do not saturate throughout the maneuver.

While the best mode for carrying out the present invention has been described in detail, those familiar with the art to which this invention relates will recognize various alternative designs and embodiments within the scope and spirit of the present invention.

What is claimed is:

1. A method for slewing a spacecraft about a desired axis using a reaction wheel system, the reaction wheel system including a plurality of reaction wheels, the method comprising:

determining a total angular momentum of the spacecraft;

determining availability of each reaction wheel in the reaction wheel system;

determining a momentum storage threshold using the reaction wheel availability;

if the total angular momentum is greater than the momentum storage threshold, then the method is halted, otherwise, determining available momentum based on the total angular momentum and the availability of each reaction wheel;

determining a slew rate magnitude and a slew direction based on available momentum; and slewing the spacecraft about the desired slew axis at the slew rate magnitude in the slew rate direction.

2. The method for slewing a spacecraft as in claim 1, each wheel in the reaction wheel system having a maximum single wheel capacity, and the reaction wheel system configuration described through a geometrical relation, wherein determining the momentum storage threshold further uses the maximum single wheel capacity and the geometrical relation.

3. The method for slewing a spacecraft as in claim 2, the reaction wheel system having maximum momentum storage capacities dependent on direction in momentum space, wherein determining the momentum storage threshold comprises:

determining a polyhedron in momentum space describing the maximum momentum in any direction, the polyhedron based on the availability of each reaction wheel, the maximum single wheel capacity, and the geometrical relation;

determining the largest sphere that can be inscribed within the polyhedron, the sphere having a radius; and determining as the momentum storage threshold the radius of the sphere.

4. The method for slewing a spacecraft as in claim 1, the reaction wheel system having maximum momentum storage capacities dependent on direction in momentum space, the maximum capacities forming a polyhedron envelop in momentum space, wherein determining available momentum comprises determining the greatest distance from the total angular momentum of the spacecraft to the farthest edge of the polyhedron envelope along a line in momentum space parallel to the slew axis.

5. The method for slewing a spacecraft as in claim 4, the polyhedron envelope being uniformly decreased by an overhead momentum margin.

6. The method for slewing a spacecraft as in claim 4, the polyhedron envelope being decreased by removing a momentum trapping margin from each polyhedron vertex that lies on the slew axis.

7. The method for slewing a spacecraft as in claim 4, wherein the step of determining the available momentum comprises using a momentum lower bound if the available momentum is less than the lower bound.

8. The method for slewing a spacecraft as in claim 1, wherein determining a slew rate magnitude and a slew direction comprises:

determining as the slew rate magnitude the ratio of the available momentum to spacecraft moment of inertia about the slew axis; and deter mining as the slew direction the sign of the total angular momentum component a long the slew axis of rotation.

9. A system for slewing a spacecraft about a desired axis, the spacecraft having a body, the system comprising:

a reaction wheel system with in the body, the reaction wheel system comprising a plurality of reaction wheels, the reaction wheel system operative to exchange rotational momentum with the body;

at least one sensor operative to detect the total rotational momentum of the spacecraft; and a control logic within the spacecraft, the control logic in communication with the reaction wheel system and the at leas t one sensor, the control logic operative to (a) determine a total angular momentum of the spacecraft, (b) determine availability of each reaction wheel in the reaction wheel system, (c) determine a momentum storage threshold using the reaction wheel availability, (d) if the total angular momentum is not greater than the momentum storage threshold, determine available momentum based on the total angular momentum and the availability of each reaction wheel, otherwise abort the slew, (e) determine a slew rate magnitude and a slew direction based on available momentum, and (f) slew the spacecraft about the desired slew axis at the slew rate magnitude in the slew rate direction.

10. The system for slewing a spacecraft as in claim 9, each wheel in the reaction wheel system having a maximum single wheel capacity, and the reaction wheel system configuration described through a geometrical relation, the control logic operable to determine the momentum storage threshold further using the maximum single wheel capacity and the geometrical relation.

11. The system for slewing a spacecraft as in claim 10, the reaction wheel system having maximum momentum storage capacities dependent on direction in momentum space, the control logic further operative to determine a polyhedron in momentum space describing the maximum momentum in any direction, the polyhedron based on the availability of each reaction wheel, the maximum single wheel capacity, and the geometrical relation, determine the largest sphere that can be inscribed within the polyhedron, the sphere having a radius, and determining as the momentum storage threshold the radius of the sphere.

12. The system for slewing a spacecraft as in claim 9, the reaction wheel system having maximum momentum storage capacities dependent on direction in momentum space, the maximum capacities forming a polyhedron envelop in momentum space, the control logic further operative to determine available momentum as the greatest distance from the total angular momentum of the spacecraft to the farthest edge of the polyhedron envelope along a line in momentum space parallel to the slew axis.

13. The system for slewing a spacecraft as in claim 12, the polyhedron envelope being uniformly decreased by an overhead momentum margin.

14. The system for slewing a spacecraft as in claim 12, the polyhedron envelope being decreased by removing a momentum trapping margin from each polyhedron vertex that lies on the slew axis.

15. The system for slewing a spacecraft as in claim 12, wherein the control logic operative to determine the available momentum uses a momentum lower bound if the available momentum is less than the lower bound.

16. The system for slewing a spacecraft as in claim 9, the control logic further operative to determine as the slew rate magnitude the ratio of the available momentum to spacecraft moment of inertia about the slew axis, and determine as the slew direction the sign of the total angular momentum component along the slew axis of rotation.

\* \* \* \* \*